(12) United States Patent
Elliott

(10) Patent No.: US 9,517,693 B2
(45) Date of Patent: Dec. 13, 2016

(54) CONVERTIBLE TANDEM AXLE ARRANGEMENT AND METHOD FOR CONVERTING A TANDEM AXLE ARRANGEMENT TO EITHER OF A SINGLE DRIVE OR A DUAL DRIVE TANDEM AXLE ARRANGEMENT

(75) Inventor: Matthew Elliott, Palmyra, PA (US)

(73) Assignee: Mack Trucks, Inc., Greensboro, NC (US)

( * ) Notice: Subject to any disclaimer, the term of this patent is extended or adjusted under 35 U.S.C. 154(b) by 0 days.

(21) Appl. No.: 14/385,279

(22) PCT Filed: Jul. 19, 2012

(86) PCT No.: PCT/US2012/047463
§ 371 (c)(1),
(2), (4) Date: Sep. 15, 2014

(87) PCT Pub. No.: WO2013/141893
PCT Pub. Date: Sep. 26, 2013

(65) Prior Publication Data
US 2015/0054243 A1    Feb. 26, 2015

Related U.S. Application Data

(60) Provisional application No. 61/613,083, filed on Mar. 20, 2012.

(51) Int. Cl.
*B60K 17/36* (2006.01)
*B60K 23/08* (2006.01)

(52) U.S. Cl.
CPC .............. *B60K 17/36* (2013.01); *B60K 23/08* (2013.01)

(58) Field of Classification Search
CPC ................................ B60K 17/36; B60K 23/08
See application file for complete search history.

(56) References Cited

U.S. PATENT DOCUMENTS

| 1,404,977 | A | * | 1/1922 | Krafve | B60K 17/36 180/24.11 |
| 1,641,333 | A | * | 9/1927 | Ingersoll | B60K 17/36 180/24.12 |
| 1,738,212 | A | | 12/1929 | Smith | |

(Continued)

OTHER PUBLICATIONS

International Preliminary Report on Patentabilty (Ch,.I)(Sep. 23, 2014) for corresponding Intenrational Application PCT/US2012/047463.

(Continued)

*Primary Examiner* — Faye M Fleming
(74) *Attorney, Agent, or Firm* — WRB-IP LLP

(57) ABSTRACT

A drive axle system can be converted between a single drive tandem axle arrangement including a rear drive axle a dual drive tandem axle arrangement. A forward bowl is provided for a forward axle system. One of a geared forward carrier and an ungeared forward carrier is mounted on the forward bowl, depending upon whether a dual drive or a single drive tandem axle arrangement is desired. To convert to the other type of tandem axle arrangement, the one of the geared forward carrier and the ungeared forward carrier is removed from the forward bowl and replaced, with the other one of the geared forward carrier and the ungeared forward carrier.

17 Claims, 4 Drawing Sheets

(56) References Cited

U.S. PATENT DOCUMENTS

| | | | | |
|---|---|---|---|---|
| 1,811,837 A * | 6/1931 | Alden | ............... | B60K 17/36 180/24.11 |
| 1,829,808 A * | 11/1931 | Opolo | ............... | B60K 17/36 180/23 |
| 1,831,862 A * | 11/1931 | Horine | ............... | B60K 17/36 180/22 |
| 1,866,637 A | 7/1932 | Fageol | | |
| 1,901,309 A * | 3/1933 | Le Moon | ............... | B60G 5/053 180/22 |
| 1,949,830 A | 3/1934 | Fageol | | |
| 1,959,585 A * | 5/1934 | Ingersoll | ............... | B60K 17/36 180/24.12 |
| 2,019,308 A * | 10/1935 | Holman | ............... | B60G 5/053 180/24.11 |
| 2,047,088 A * | 7/1936 | Thornton | ............... | B60K 17/36 180/24.09 |
| 2,253,330 A | 8/1941 | Hersey et at | | |
| 2,579,556 A | 12/1951 | Drong | | |
| 3,590,954 A | 7/1971 | Plantan | | |
| 4,754,847 A * | 7/1988 | Glaze | ............... | B60K 17/16 184/6.12 |
| 5,076,391 A | 12/1991 | Ljungholm et al. | | |
| 5,775,458 A | 7/1998 | Salo | | |
| 6,752,235 B1 * | 6/2004 | Bell | ............... | B60G 3/20 180/24.04 |
| 7,232,398 B2 | 6/2007 | Garcia et al. | | |
| 7,410,440 B2 * | 8/2008 | Garcia | ............... | B60B 35/08 29/401.1 |
| 2015/0137586 A1 * | 5/2015 | Bassi | ............... | B60K 17/346 301/137 |

OTHER PUBLICATIONS

International Search Report (Oct. 10, 2012) for corresponding Intenrational Application PCT/US2012/047463.
Office Action dated Mar. 24, 2016 of corresponding Japan application No. 2015-501656 translated.

* cited by examiner

CONVERTIBLE TANDEM AXLE ARRANGEMENT AND METHOD FOR CONVERTING A TANDEM AXLE ARRANGEMENT TO EITHER OF A SINGLE DRIVE OR A DUAL DRIVE TANDEM AXLE ARRANGEMENT

BACKGROUND AND SUMMARY

The present invention relates to a convertible tandem axle arrangement and method wherein a single drive tandem axle arrangement can be converted to a dual drive, tandem axle arrangement, or vice versa.

Tandem axle arrangements for truck tractors are typically provided with either a single drive axle and a single tag axle (referred to as a 6×2 arrangement) or with dual drive axles (referred to as a 6×4 arrangement). Single drive tandem axle arrangements tend to have lighter weight, provide for better fuel economy, lower installation cost, and offer improved reliability over dual drive tandem axle arrangements. They are mostly used in highway applications.

Dual drive tandem axle arrangements tend to be more versatile than single drive tandem axle arrangements and, consequently, single drive tandem axle arrangements tend to have low resale value because it is difficult and expensive to convert, them to dual drive tandem axle arrangements.

Most tag axles have a different profile and use different suspension and wheel equipment than the drive axle of the tandem axle arrangement. In a conversion of a single drive tandem axle arrangement to a dual drive tandem axle arrangement, not only must the entire original tag axle be replaced with the new drive axle, ordinarily much or all of the suspension and wheel equipment must be replaced with new equipment. It is desirable to provide a tandem axle arrangement that can be conveniently converted from a single drive tandem axle arrangement to a dual drive tandem axle arrangement. It is particularly desirable to provide a tandem axle arrangement that permits the conversion without the need to replace the entire axle arrangement, suspension equipment, and wheel equipment.

In the single drive axle arrangements, the drive axle can be provided on a forward axle or a rear axle. However, at take off of a tandem vehicle, weight shifts rearwardly, putting load on the rear axle and taking load off of the front axle. Accordingly, it can be advantageous to provide the drive axle on the rear axle because that arrangement provides improved traction at take off. It is desirable to provide a convertible tandem axle arrangement that has a rear drive axle when used as a single drive tandem axle arrangement.

According to an aspect of the present invention, a removable carrier housing for a forward tag axle system comprises means for removably mounting the carrier housing to a bowl of a forward tag axle system, a beating arrangement, and a shaft supported by the bearing arrangement and extending from a front end of the carrier housing to a rear end of the carrier housing.

According to another aspect of the present invention, a single drive tandem axle arrangement comprises a forward axle system comprising a forward bowl, and a forward carrier removably mounted on the forward bowl and comprising a shaft supported by bearings and extending from a forward end of the forward carrier to a rear end of the forward carrier.

According to another aspect of the present invention, a method of converting a drive axle system between a single drive tandem axle arrangement comprising a rear drive axle a dual drive tandem axle arrangement comprises providing a forward bowl for a forward axle system, mounting one of a geared forward carrier and an ungeared forward carrier on the forward bowl, and removing the one of the geared forward Lanier and the ungeared forward carrier from the forward bowl and replacing it with the other one of the geared forward carrier and the ungeared forward carrier.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
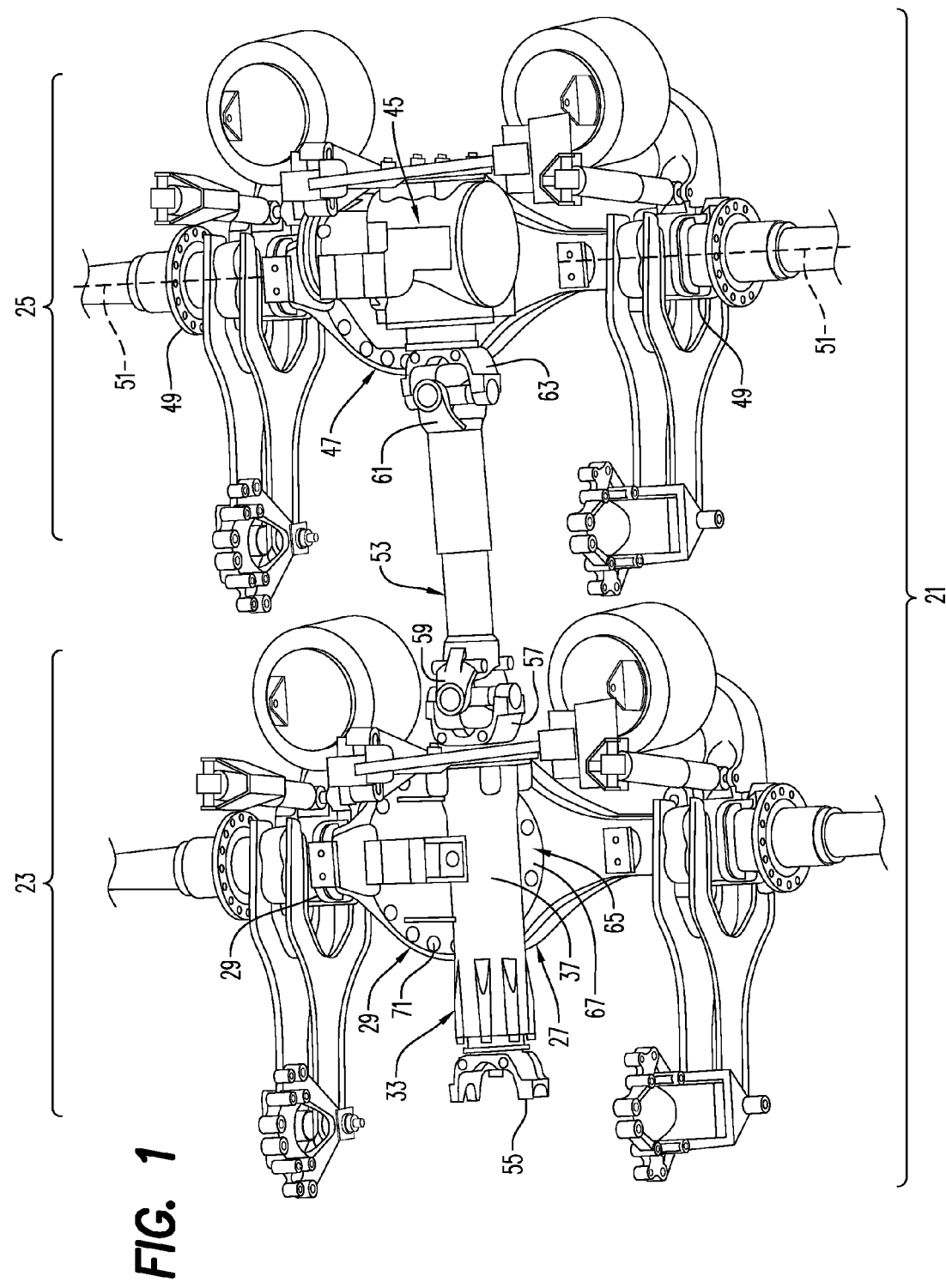
FIG. 1 is a perspective view of a single drive tandem axle arrangement according to an aspect of the present invention.
Figure 2:
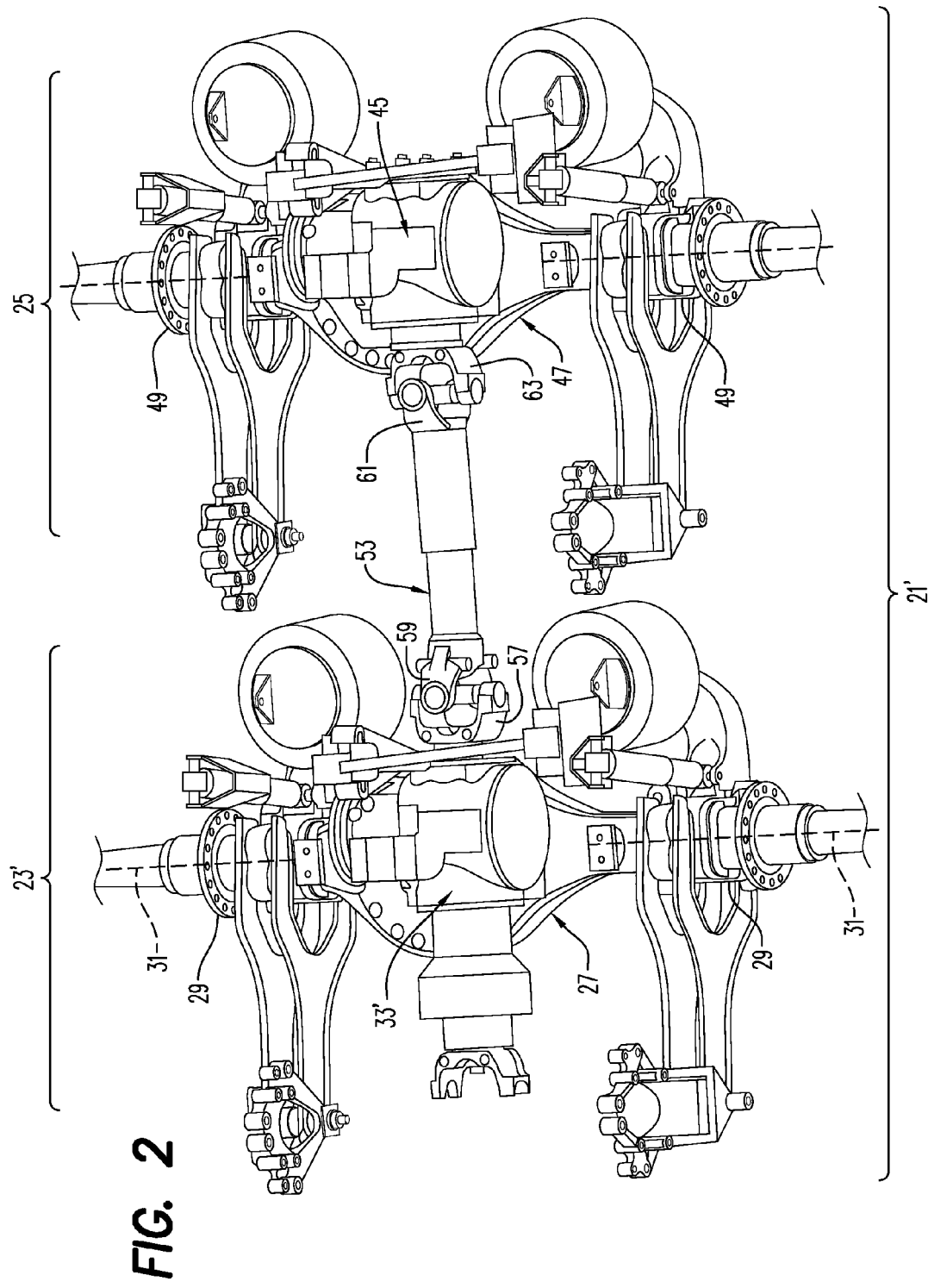
FIG. 2 is a perspective view of a dual drive tandem axle arrangement according to an aspect of the present invention.

A convertible tandem axle arrangement according to an aspect of the present invention is convertible from a single drive tandem axle arrangement 21 comprising a forward tag axle system 23 and a rear drive axle system 25 as seen in FIG. 1 to a dual drive tandem axle arrangement 21' comprising a forward drive axle system 23' and the rear drive axle system 25 as seen in FIG. 2.

Figure 3:
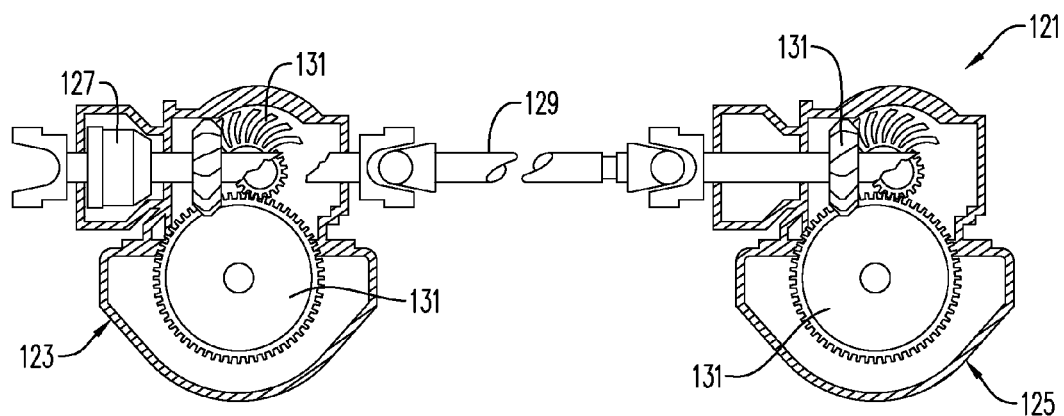
FIG. 3 is a cross-sectional view of a conventional dual drive tandem axle arrangement according to an aspect of the present invention.

The dual drive tandem axle arrangement 21' can be a conventional 6×4 tandem axle arrangement such as the arrangement available from Mack Trucks, Inc., Greensboro, N.C., US, including the Mack Trucks C150 Series axle carriers 121 as seen in FIG. 3 where a forward drive axle system 123 includes a power divider lock out 127 and forward and rear drive, axle systems (121 and 125) are linked by an interaxle drive shaft 129, The C150 Series axle carrier 121 also includes gears 131 in the forward and rear drive axle systems that are adapted to be connected to axle shafts (not shown in FIG. 3) disposed in arms (not shown in FIG. 3) to drive the axle shafts and wheels (not shown) attached to the axle shafts.

The single drive tandem axle arrangement (6×2) 21 shown in FIG. 1 includes a forward tag axle system 23 comprising a forward bowl 27. Two generally coaxial arms 29 ordinarily extend in opposite directions from the forward bowl 27 and, when the forward bowl is converted to use in a forward drive axle system 23', axle shafts 31 (shown in phantom in FIG. 2) are removably mounted in the arms.

Figure 4:
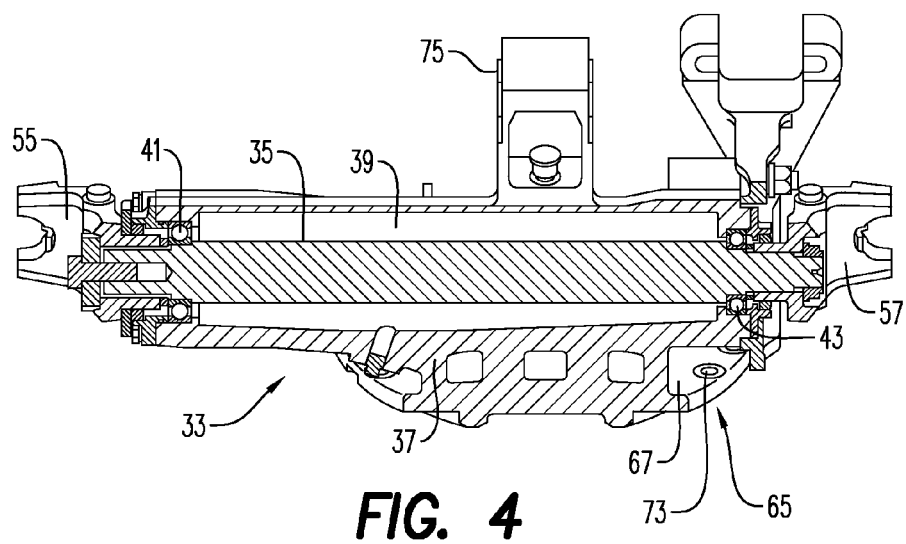
FIG. 4 is an upper left side, perspective, cross-sectional view of a carrier housing for a tag axle of a single drive tandem axle arrangement according to an aspect of the present invention.

The single drive tandem axle arrangement 21 shown in FIG. 1 includes a forward carrier 33 removably mounted on the forward bowl 27. As seen in FIG. 4, the forward carrier 33 includes a shaft 35 supported by bearings and extending from a forward end of the forward carrier to a rear end of the forward carrier. The forward carrier 33 comprises a body 37 and a passage 39 through the body through which the shaft 35 extends. The bearings comprise to bearing 41 at a front end and bearing 43 at a rear end of the passage 39 in the body 37 of the carrier 33. Gears of the type shown in the forward drive axle system 123 in FIG. 3 are ordinarily omitted from the forward carrier 33 and forward bowl 29.

The single drive tandem axle arrangement 21 also includes the rear drive axle system 25. The rear drive axle system 25 comprises a geared rear carrier 45 and rear bowl 47 on which the rear carrier is mounted. Two generally coaxial arms 49 ordinarily extend in opposite directions from the rear bowl 47 and axle shafts 51 (shown in phantom in FIGS. 1 and 2) are mounted in the arms. An interaxle drive, shaft 53 extends between the shaft 35 and the geared rear carrier 45, U-joint hinges 55 and 57 are ordinarily provided at opposite ends of the shaft 35. The forward U-joint hinge 55 is ordinarily connected to the U-joint, hinge (not shown) of a drive shaft (not shown), the rear U-joint hinge 57 is ordinarily connected to a forward U-joint hinge 59 on the interaxle drive shaft 53, and a rear U-joint hinge 61 on the interaxle drive shaft is ordinarily connected to a U-joint hinge 63 on a shaft extending into the geared rear carrier 45.

Figure 5A:
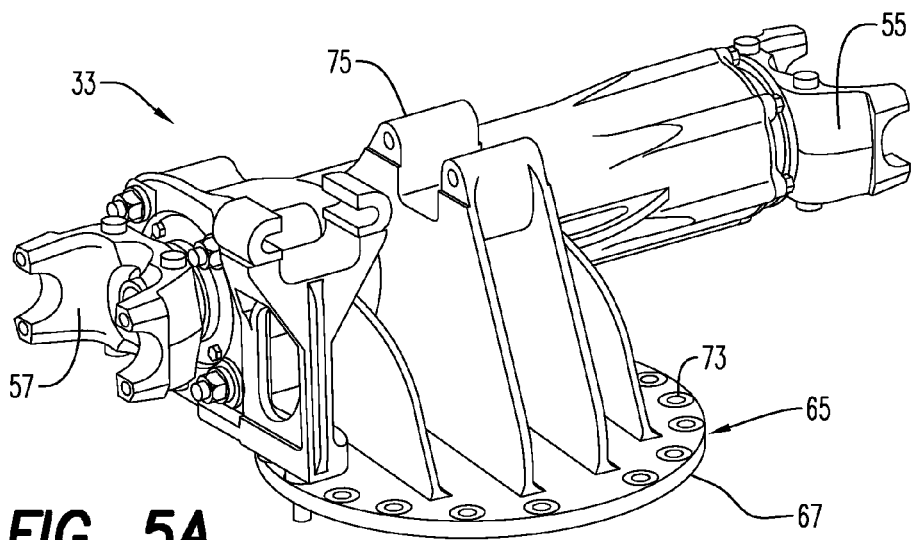
FIGS. 5A-5C are upper left side, upper right side, and lower left side perspective views of a carrier housing for a tag axle of a single drive tandem axle arrangement according to an aspect of the present invention.
Figure 5B:
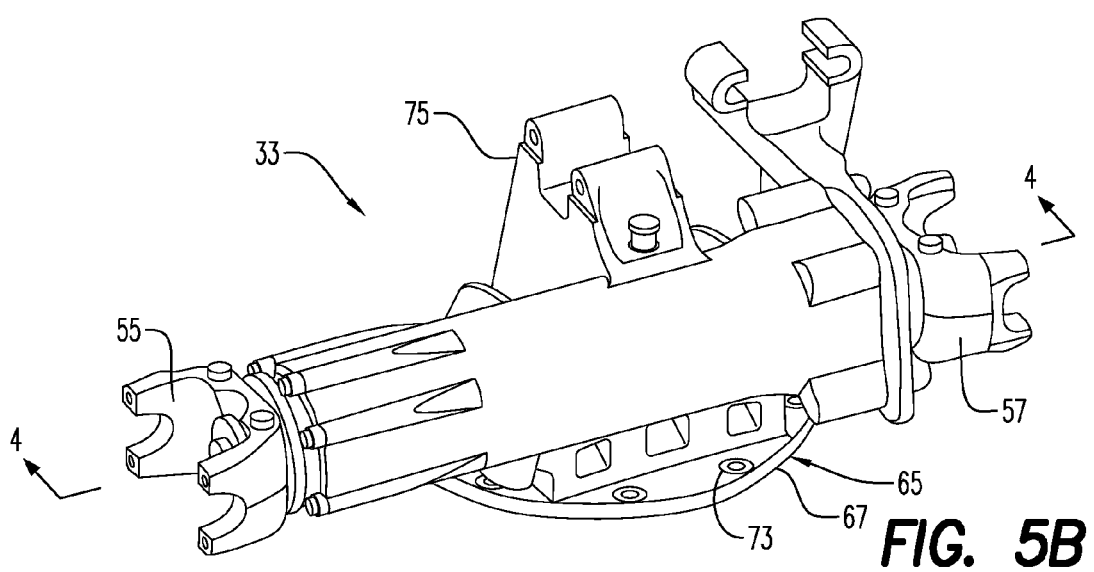
Figure 5C:
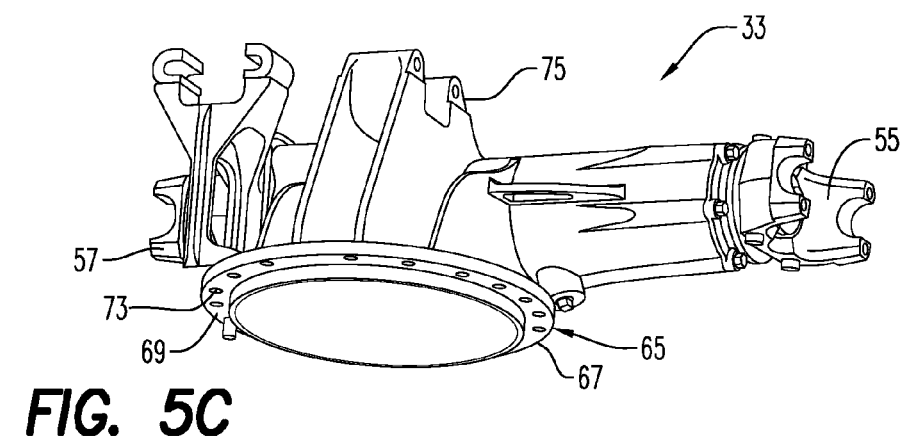

To facilitate conversion of the single drive tandem axle arrangement 21 to the dual drive tandem axle arrangement 21', as seen, for example, in FIGS. 5A-5C, the forward carrier 33 ordinarily comprises a mounting flange 65 having a rim 67 with a surface 69 (FIG. 5C) adapted to face and be mounted to a corresponding surface, usually a flange rim, on the forward bowl 27. Typically, the forward carrier 33 is mounted to the forward bowl 27 by means of bolts 71 (FIGS. 1 and 2) extending through holes flange rims on the forward carrier and the forward bowl. Holes 73 are seen on the flange rim 67 of forward carrier 33 in FIG. 4. In a similar fashion, the geared rear carrier 45 is typically mounted on the rear bowl 47 by bolts 71 attaching flanged surfaces of the geared rear carrier and the rear bowl.

Ordinarily, the rim surface 69 is substantially planar and a longitudinal axis of the shaft 35 extends generally parallel to a plane of the rim surface. The forward axle system 23 or 23' comprises the two generally coaxial arms 29 extending in opposite directions from the forward bowl 27, and the one of the geared forward carrier 33 and the ungeared forward carrier 33 comprises the front and rear U-joint hinges 55 and 57, with axes of the arms and a line between the from and rear U-joint hinges ordinarily at least approximately defining the plane of the surface 69 of the rim 67 of the mounting flange. With this configuration, when the bolts 71 are removed from the forward carrier 33 and the forward bowl 27, the forward carrier can ordinarily conveniently be lifted vertically off of the forward bowl when it is desired to remove the forward carrier. Similarly, when it is desired to mount a geared forward carrier 33' to the forward bowl 27, the geared forward carrier can be lowered vertically onto the forward bowl.

One or more attachment flanges 75 for attaching the body 33 to a vehicle (not shown) via bolts (not shown) is ordinarily also provided.

The convertible tandem axle arrangement can be arranged the forward carrier 33 can be removed and replaced with a geared forward carrier 33' and axle shafts 31 using the same interaxle drive shaft and suspension. Thus, minimal additional parts are required. In addition, when the tandem axle arrangement is used in a 6×2 single drive, tandem axle) arrangement, the drive axle is the rear axle, which optimizes traction at take-off.

In a method of converting a drive axle system between as single drive tandem axle arrangement 21 (FIG. 1) comprising a rear drive axle 25 and a dual drive tandem axle arrangement 21' (FIG. 2), a forward bowl 27 is provided for a forward axle system. One of a geared forward carder 33' and an ungeared forward carrier 23 is mounted on the forward bowl 27 to form a forward drive axle system 23' and a forward tag axle system 23, respectively. To convert the forward drive axle system 23' and a forward tag, axle system 23 to the other system, i.e., to a forward tag axle system 23 and a forward drive axle system 23', respectively, the one of the geared forward carrier and the ungeared forward carrier is removed from the forward bowl 27 and replaced with the other one of the geared forward carrier and the ungeared forward carrier. This is ordinarily accomplished by removing bolts 71 securing the forward carrier 23 or 23' to the forward bowl 27, disconnecting the U-joint hinges connecting the forward carrier to the drive shaft and the interaxle drive shaft 53, removing bolts attaching the attachment flange 75 of the forward carrier to the vehicle, vertically lifting the forward carrier out of/off of the forward housing, installing or removing axle shafts, depending upon whether the axle system will be a drive axle or a tag axle, respectively, and vertically lowering the new replacement forward carrier onto the forward housing and attaching it to the drive shafts and the vehicle.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A removable carrier housing for a forward tag axle system, comprising
    means for removably mounting the carrier housing to a top of a bowl of a forward tag axle system;
    a bearing arrangement;
    a shaft supported by the bearing arrangement and extending from a front end of the carrier housing to a rear end of the carrier housing, and
    a body comprising one or more attachment flanges for attaching the body to a vehicle.

2. The removable carrier housing as set for in claim 1, comprising a U-joint hinge at opposite ends of the shaft.

3. The removable carrier housing as set forth in claim 1, wherein the mounting means comprises a flange having a rim with a surface adapted to face a corresponding surface on the bowl.

4. A removable carrier housing for a forward tag axle system, comprising
    means for removably mounting the carrier housing to a bowl of a forward tag axle system;
    a bearing arrangement; and
    a shaft supported by the bearing arrangement and extending from a front end of the carrier housing to a rear end of the carrier housing,
    wherein the mounting means comprises a flange having a rim with a surface adapted to face a corresponding surface on the bowl, and
    wherein the rim surface is substantially planar and a longitudinal axis of the shaft extends generally parallel to a plane of the rim surface.

5. The removable carrier housing as set forth in claim 1, comprising a body and a passage through the body through which the shaft extends, the bearing arrangement comprising a bearing at a front end and bearing at a rear end of the housing.

6. The removable carrier housing as set forth in claim 4, comprising a body comprising one or more attachment flanges for attaching the body to a vehicle.

7. A single drive tandem axle arrangement comprising:
a forward axle system comprising a forward bowl; and
a forward carrier removably mounted on top of the forward bowl and comprising a shaft supported by bearings and extending from a forward end of the forward carrier to a rear end of the forward carrier,
wherein the forward carrier comprises a body comprising one or more attachment flanges for attaching the body to a vehicle.

8. The single drive tandem axle arrangement as set forth in claim 7, comprising a rear drive axle system, the rear drive axle system comprising a geared rear carrier, the single drive tandem axle arrangement comprising an interaxle drive shaft extending between the shaft and the geared rear carrier.

9. The single drive tandem axle arrangement as set forth in claim 7, comprising a U-joint hinge at opposite ends of the shaft.

10. The single drive tandem axle arrangement as set forth in claim 7, wherein the forward carrier comprises a mounting flange having a rim with a surface adapted to face and be mounted to a corresponding surface on the forward bowl.

11. A single drive tandem axle arrangement comprising:
a forward axle system comprising a forward bowl; and
forward carrier removably mounted on the forward bowl and comprising a shaft supported by bearings and extending from a forward end of the forward carrier to a rear end of the forward carrier,
wherein the forward carrier comprises a mounting flange having a rim with a surface adapted to face and be mounted to a corresponding surface on the forward bowl, and
wherein the rim surface is substantially planar and a longitudinal axis of the shaft extends generally parallel to a plane of the rim surface.

12. The single drive tandem axle arrangement as set forth in claim 7, wherein the forward carrier comprises a body and a passage through the body through which the shaft extends, the bearings comprising a bearing at a front end and bearing at a rear end of the passage.

13. The single drive tandem axle arrangement as set forth in claim 11, wherein the forward carrier comprises a body comprising one or more attachment flanges for attaching the body to a vehicle.

14. A method of converting a drive axle system between a single drive tandem axle arrangement comprising a rear drive axle a dual drive tandem axle arrangement, comprising:
providing a forward bowl for a forward axle system
mounting one of a geared forward carrier and an ungeared forward carrier on the forward bowl;
removing the one of the geared forward carrier and the ungeared forward carrier from the forward bowl and replacing it with the other one of the geared forward carrier and the ungeared forward carrier,
mounting the one of the geared forward carrier and the ungeared forward carrier to the forward bowl by attaching a mounting flange of the one of the geared forward carrier and the ungeared forward carrier to the forward bowl,
wherein the mounting flange has a rim with a surface adapted to face and be mounted to a corresponding surface on the forward bowl, wherein the forward axle system comprises two generally coaxial arms extending in opposite directions from the forward bowl, the one of the geared forward carrier and the ungeared forward carrier comprises front and rear U-joint hinges, axes of the arms and a line between the front and rear U-joint hinges defining a plane, the surface of the rim of the mounting flange being substantially planar and parallel to the plane, and
removing the one of the geared forward carrier and the ungeared forward carrier from the forward bowl by lifting the one of the geared forward carrier and the ungeared forward carrier perpendicular to the plane.

15. The method as set forth in claim 14, comprising providing a rear drive axle system, and linking the one of the geared forward carrier and the ungeared forward carrier to the rear drive axle system by an interaxle drive shaft.

16. The method as set forth in claim 14, wherein the forward axle system comprises two generally coaxial arms extending in opposite directions from the forward bowl, the method comprising installing axle shafts in the arms when mounting the geared forward carrier on the forward bowl.

17. The method as set forth in claim 14, wherein the forward axle system comprises two generally coaxial arms extending in opposite directions from the forward bowl, the method comprising removing axle shafts from the arms when mounting the ungeared forward carrier on the forward bowl.

* * * * *